US009581691B2

(12) United States Patent
Simicevic et al.

(10) Patent No.: US 9,581,691 B2
(45) Date of Patent: Feb. 28, 2017

(54) SYSTEM AND METHOD FOR GROUND PENETRATING RADAR COMMUNICATION USING ANTENNA CROSSTALK (75) Inventors: Neven Simicevic, Ruston, LA (US); Arun Jaganathan, Ruston, LA (US); James L. Montgomery, Dubuque, IA (US); Jay H. Olson, Bettendorf, IA (US)

(73) Assignees: Deere & Company, Moline, IL (US); Louisiana Tech University Research Foundation, A Division Of Louisiana Tech University Foundation, Inc., Ruston, LA (US)

( * ) Notice: Subject to any disclaimer, the term of this patent is extended or adjusted under 35 U.S.C. 154(b) by 469 days.

(21) Appl. No.: 14/124,567

(22) PCT Filed: Jun. 9, 2011

(86) PCT No.: PCT/US2011/039738
§ 371 (c)(1),
(2), (4) Date: Apr. 16, 2014

(87) PCT Pub. No.: WO2012/170024
PCT Pub. Date: Dec. 13, 2012

(65) Prior Publication Data
US 2014/0218225 A1    Aug. 7, 2014

(51) Int. Cl.
*G01S 13/06* (2006.01)
*G01S 13/88* (2006.01)
*H01Q 9/28* (2006.01)
*H01Q 13/08* (2006.01)
*H01Q 19/10* (2006.01)
*H01Q 21/08* (2006.01)

(52) U.S. Cl.
CPC ............. *G01S 13/885* (2013.01); *H01Q 9/28* (2013.01); *H01Q 13/085* (2013.01); *H01Q 19/10* (2013.01); *H01Q 21/08* (2013.01)

(58) Field of Classification Search
CPC ........... G01S 13/885; G01V 3/12; H01Q 9/28
USPC .......................................................... 342/22
See application file for complete search history.

(56) References Cited

U.S. PATENT DOCUMENTS 4,600,356 A * 7/1986 Bridges ................... E02F 9/245
172/6
5,647,439 A * 7/1997 Burdick .................... E01H 5/00
172/4.5
(Continued)

FOREIGN PATENT DOCUMENTS

CN    100403057    7/2008
CN    201581420    9/2010
(Continued)

OTHER PUBLICATIONS

Office Action for Chinese Application No. 201180071515.5 mailed Nov. 17, 2015 along with an English translation.
(Continued)

*Primary Examiner* — Marcus Windrich
(74) *Attorney, Agent, or Firm* — Kilpatrick Townsend & Stockton LLP (57) ABSTRACT An object detection system (24) is disclosed having a transducer (40, 40') for detecting buried objects (26). The transducer is encapsulated within a robust, electromagnetically transparent construction (42).

27 Claims, 9 Drawing Sheets (56) References Cited

U.S. PATENT DOCUMENTS

| | | | | |
|---|---|---|---|---|
| 5,659,985 | A * | 8/1997 | Stump | E02F 5/06 172/3 |
| 5,777,892 | A * | 7/1998 | Nabity | G01F 1/002 702/143 |
| 6,522,285 | B2 * | 2/2003 | Stolarczyk | F41H 11/12 342/118 |
| 6,546,529 | B1 | 4/2003 | Dansky et al. | |
| 2002/0063652 | A1 * | 5/2002 | Price | E02F 9/245 342/22 |
| 2003/0076254 | A1 * | 4/2003 | Witten | G01S 7/28 342/22 |
| 2004/0155810 | A1 | 8/2004 | Witten | |
| 2004/0168358 | A1 | 9/2004 | Stump | |
| 2007/0260378 | A1 * | 11/2007 | Clodfelter | F41H 11/12 701/48 |
| 2008/0136703 | A1 | 6/2008 | Yoshimura | |
| 2008/0185903 | A1 * | 8/2008 | Bausov | E21C 27/24 299/1.2 |
| 2008/0218400 | A1 * | 9/2008 | Stolarczyk | E21C 35/24 342/22 |
| 2011/0115667 | A1 * | 5/2011 | Feigin | G01S 7/4008 342/22 |

FOREIGN PATENT DOCUMENTS

| | | |
|---|---|---|
| GB | 2348545 | 10/2000 |
| JP | H11-83995 | 3/1999 |
| JP | 2000-121576 | 4/2000 |
| JP | 2000-121577 | 4/2000 |
| JP | 2000-266843 | 9/2000 |
| JP | 2002-181955 | 6/2002 |
| JP | 2002-296346 | 10/2002 |
| JP | 2005-99032 | 4/2005 |
| WO | 2006/079154 | 8/2006 |
| WO | 2011/043766 | 4/2011 |

OTHER PUBLICATIONS

Office Action for Japanese Application No. 2014-514441 mailed Mar. 8, 2016 with an English translation (4 pages).
Office Action for Japanese Application No. 2014-514441 mailed Jan. 27, 2015 along with an English translation (9 pages).
Examination Report for Great Britain Application No. GB1320160.3 mailed Nov. 27, 2014 (4 pages).
Examination Report for Application No. GB1320160.3 mailed Feb. 2, 2015 (4 pages).
International Search Report and Written Opinion mailed Oct. 27, 2011 in related International Application No. PCT/US2011/039738.
Office Action from Chinese Patent Application No. 201180071515.5 mailed Jul. 14, 2016 along with an English translation.

* cited by examiner

SYSTEM AND METHOD FOR GROUND PENETRATING RADAR COMMUNICATION USING ANTENNA CROSSTALK

This application is a U.S. national stage of PCT/US2011/039738, filed Jun. 9, 2011, the disclosure of which is expressly incorporated herein by reference in its entirety.

BACKGROUND

Field of the Invention

The present disclosure relates to a system and method for communicating with ground penetrating radar. More particularly, the present disclosure relates to a system and method for ground penetrating radar communication utilizing antenna crosstalk in the detection of buried objects.

Description of the Related Art

Many excavations are performed in well-developed, utility-congested areas. The congestion of underground space in many urban areas, combined with poor record keeping and difficulties in accurately locating buried utilities from the surface, has led to many inadvertent utility strikes during mechanical excavations. Utility strikes may lead to work-stop orders and delays, mechanical damage to buried utilities, and numerous costs associated with litigation, insurance, downtime, and repair.

SUMMARY

According to an exemplary embodiment of the present disclosure, a method of communicating with ground penetrating radar is provided. The method includes the steps of providing a transmitter and a detector each coupled to a tool configured to penetrate the ground, communicating a ground-penetrating signal with the transmitter, and detecting crosstalk from the ground-penetrating signal with the detector. The method further includes the step of determining a position of at least one of the detector and the transmitter relative to the ground based on a characteristic of the crosstalk.

According to another exemplary embodiment of the present disclosure, a method of communicating with ground penetrating radar is provided. The method includes the step of providing a tool and a detection system coupled to the tool. The detection system includes a transmitter and a receiver, and the tool is configured to penetrate the ground. The method further includes the steps of communicating a ground-penetrating signal with the transmitter and determining a position of the detection system relative to the ground based on signal coupling between the transmitter and the receiver. The method further includes the step of increasing a magnitude of the ground-penetrating signal upon a determination that the detection system is in contact with the ground.

According to yet another exemplary embodiment of the present disclosure, a method of communicating with ground penetrating radar is provided. The method includes the step of providing a tool and a detection system coupled to the tool. The detection system includes a transmitter and a receiver and is configured to detect an object positioned in the ground. The method further includes the steps of penetrating the ground with the tool to create a penetration, communicating a signal between the transmitter and the object, and identifying crosstalk from the signal with the receiver. The method further includes the step of determining a dielectric property of the ground based on the crosstalk of the signal.

According to still another exemplary embodiment of the present disclosure, a construction vehicle is provided including a chassis, a plurality of traction devices positioned to support the chassis, and a work tool supported by the chassis and configured to penetrate the ground. The vehicle further includes a detection system including a transmitter configured to communicate a ground-penetrating signal and a detector configured to detect crosstalk from the ground-penetrating signal. The transmitter and the detector are mounted to the work tool. The detection system is configured to determine a position of at least one of the detector and the transmitter relative to the ground based on a characteristic of the crosstalk from the ground-penetrating signal.

According to another exemplary embodiment of the present disclosure, a detector assembly is provided that is configured to detect an object positioned in the ground. The detector assembly includes a housing structure having an interior region. The detector assembly further includes an antenna positioned in the interior region of the housing structure. The antenna is configured to communicate a ground-penetrating signal. A dielectric medium is molded around the housing structure. The housing structure and the dielectric medium cooperate to substantially reduce signal loss during a communication of the ground-penetrating signal between the antenna and the ground.

According to yet another exemplary embodiment of the present disclosure, a method of communicating with ground-penetrating radar is provided. The method includes the step of providing a work tool, a transducer, and a housing structure having an interior region for receiving the transducer. The method further includes the steps of molding a dielectric medium around the housing structure, securing the transducer in the interior region of the housing structure, and coupling the housing structure and the transducer to the work tool. The method further includes the steps of penetrating the ground with the work tool to create a penetration and communicating a ground-penetrating signal with the transducer during the penetrating step.

BRIEF DESCRIPTION OF THE DRAWINGS

The above-mentioned and other features of the present disclosure will become more apparent and the present disclosure itself will be better understood by reference to the following description of embodiments of the present disclosure taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

The embodiments disclosed below are not intended to be exhaustive or limit the disclosure to the precise form disclosed in the following detailed description. Rather, the embodiments are described so that others skilled in the art may utilize its teachings.

Figure 1:
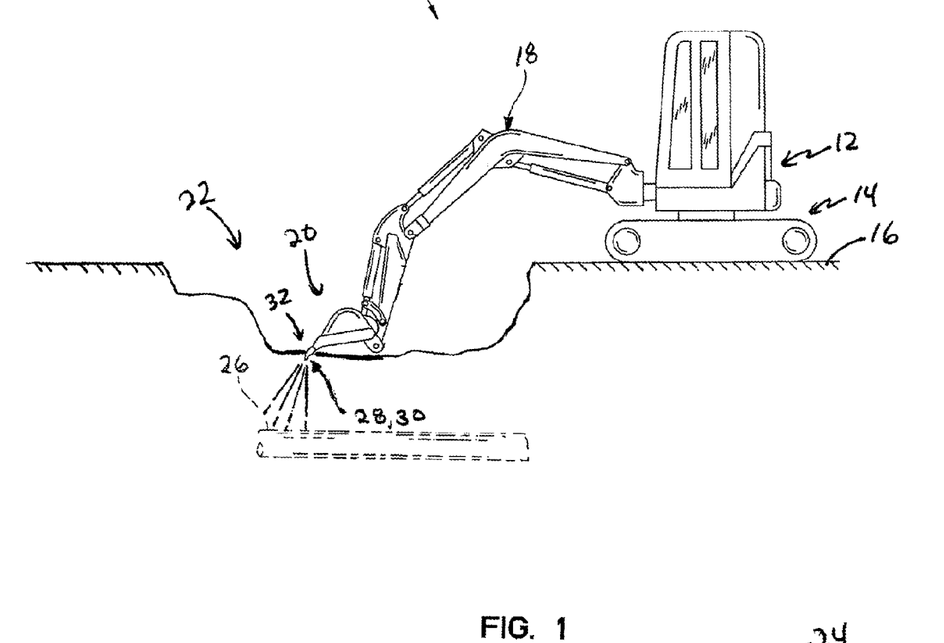
FIG. 1 is a side elevation view of an excavator illustrating the excavator excavating an area and having a ground penetrating radar positioned towards a tip of the excavator bucket to detect objects located in the ground.

An excavator 10 is shown in FIG. 1 that includes a chassis 12 and a plurality of fraction devices 14, such as tracks, that support and propel chassis 12 over the ground 16. Excavator 10 further includes a boom 18 supporting a work tool or bucket 20 that is configured to penetrate the ground 16 to create a trench, hole, pit, or other depression 22 in the ground 16. Excavator 10 further includes an object detection radar system 24, shown in FIG. 2, which is configured to detect objects 26, such as a utility pipes and wires, in the ground 16. Although an excavator 10 is shown in FIG. 1 and discussed in the application, other construction vehicles, such as backhoes, loaders, bulldozers, graders, and other constructions vehicles may be provided with object detection system 24. Further, although traction devices 14 are shown as tracks, other traction devices, such as wheels may be provided on construction vehicle 10.

Portions of object detection radar system 24 are mounted on bucket 20. According to the preferred embodiment of the present disclosure, detection system 24 includes a transmitter 28 and/or a receiver/detector 30 mounted on bucket 20. For example, according to the embodiment shown in FIG. 1, transmitter 28 and detector 30 are mounted on one or more teeth 32 of bucket 20. Transmitter 28 and detector 30 may also be mounted on other construction equipment work tools, such as bulldozer or grader blades, loader or backhoe buckets, or other work tools.

With transmitter 28 and detector 30 mounted on teeth 32, transmitter 28 and detector 30 are in direct contact with the ground 16 during excavation of depression 22. By placing transmitter 28 and detector 30 in direct contact with the ground 16, signal losses are reduced during communication of the ground-penetrating signal between the transducer and the ground 16.

Figure 2:
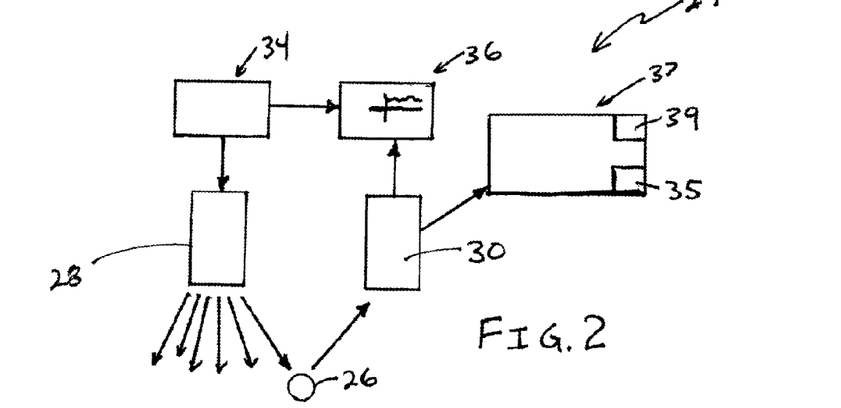
FIG. 2 is a schematic diagram of ground penetrating radar illustrating the radar including a transmitting antenna and a receiving antenna that transmit and detect objections located in the ground.

Transmitter 28 is configured to emit electromagnetic waves and receiver 30 is configured to detect electromagnetic waves. In one embodiment, transmitter 28 and detector/receiver 30 utilize ultra-wide band (UWB) communication. As shown in FIG. 2, detection system 24 includes a signal generator 34, such as a Picosecond Pulse Labs Generator Model 4500D, and a signal detection monitor 36, such as a Tektronix Oscilloscope Model DSA 8200). Signal generator 34 provides a signal to transmitter 28 that emits the ground-penetrating signal into the ground 16 and provides a trigger signal to monitor 36. Objects 26, such as a pipe, reflect the ground-penetrating signal and detector 30 detects signals reflected off of object 26. Monitor 36 provides a visual representation of the reflected signal for visual analysis. A computer 37 with a processor 39 may also be used to analyze the signal provided with detector 30.

Figure 3:
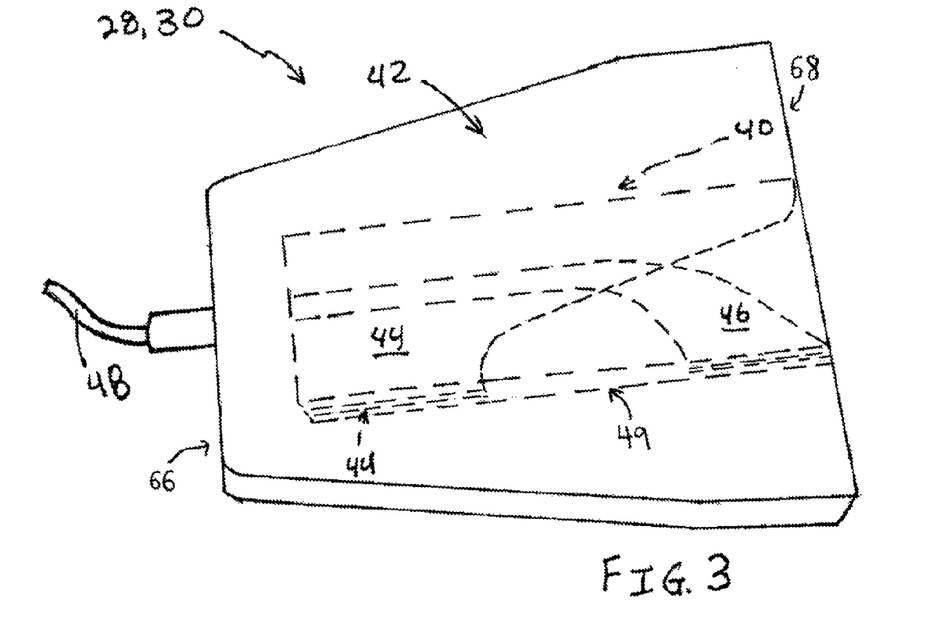
FIG. 3 is a perspective view of a portion of an excavator bucket tooth including an encapsulated transceiver antenna, shown in phantom.

One embodiment of transmitter 28 and detector 30 is shown in FIG. 3 as a Vivaldi antipodal antenna. Each of transmitter 28 and detector 30 includes a Vivaldi antenna 40 and body 42 that encapsulates antenna 40. Antenna 40 is an electromagnetic transducer that detects/converts electromagnetic waves into signals useable for analysis. As discussed below, other types of antennas and other transducers may also be used according to the present disclosure.

Figure 5:
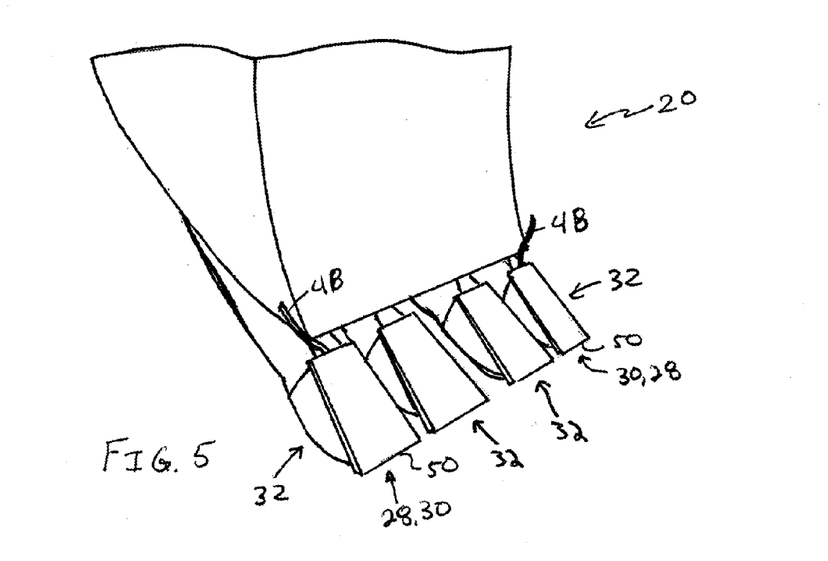
FIG. 5 is a view of the antenna of FIG. 3 mounted on an excavator bucket.

After fabrication of antenna/transducer 40, antenna/transducer 40 is encased in one or more materials that form body 42 to provide a protective casing or shell around antenna 40. As illustrated in FIG. 3, body 42 illustratively includes a base end 66 and a cutting end 68 opposite base end 66. Cutting end 68 is illustratively wider than base end 66, although other configurations of body 42 may be provided. A cable 48 coupled at base end 66 of body 42 provides an electrical connection between antenna 40 and signal generator 34 (FIG. 2). As illustrated in FIG. 5, cutting end 68 includes a cutting edge 50, as described herein.

According to the preferred embodiment of the present disclosure, body 42 of FIG. 3 is made of a high strength dielectric medium. The dielectric material may be a polymer or a ceramic material that may include fiber reinforcements, such as micro-fibers or nano-fibers, for example, to enhance the durability of body 42. For example, according to one embodiment, body 42 is made of high modulus polyurea with a dielectric constant of approximately 4. Other exemplary materials include rigid polyurethane, epoxy, other thermoplastic or thermoset materials, and other non-conductive materials. Body 42 may also be coated with materials to increase its durability and/or its abrasion resistance. Body 42 may also be coated with carbon or other electromagnetic insulating materials to insulate antenna 40 from adjacent conductive surfaces to reduce or prevent signal leakage, ringing, or other interference. Preferably, the dielectric medium has a dielectric constant about equal to the ground 16. According to the present disclosure, the dielectric medium has a dielectric constant ranging from about 1 to about 20, but may have other values. In one embodiment, the dielectric medium serves to reduce signal loss during signal communication between antenna 40 and the ground 16.

In one embodiment, body 42 is molded around an insert to form a pocket for receiving antenna 40. See, for example, insert 49 illustrated in FIG. 3. Insert 49 includes an interior region sized to receive antenna 40. After molding the dielectric material of body 42 around insert 49, antenna 40 may be inserted within the interior region of insert 49 in a secondary assembly operation. Alternatively, antenna 40 may be secured within insert 49 prior to molding body 42 around insert 49. In one example, body 42 is made of a cast polyurethane formed around insert 49. Other types of thermoset or thermoplastic materials and processes may be used for molding body 42 around insert 49. In one embodiment, insert 49 is comprised of a high strength dielectric material having similar dielectric properties to body 42. In one embodiment, insert 49 is comprised of a rigid plastic or other polymer material providing a high strength housing structure around antenna 40. Antenna 40 may be preassembled before being secured within insert 49 or may be assembled within insert 49. An insert structure, such as insert 49, may be used to house other types of antennas or antenna arrays, such as discone antennas 40' illustrated in FIGS. 10-11 and described herein.

Figure 4:
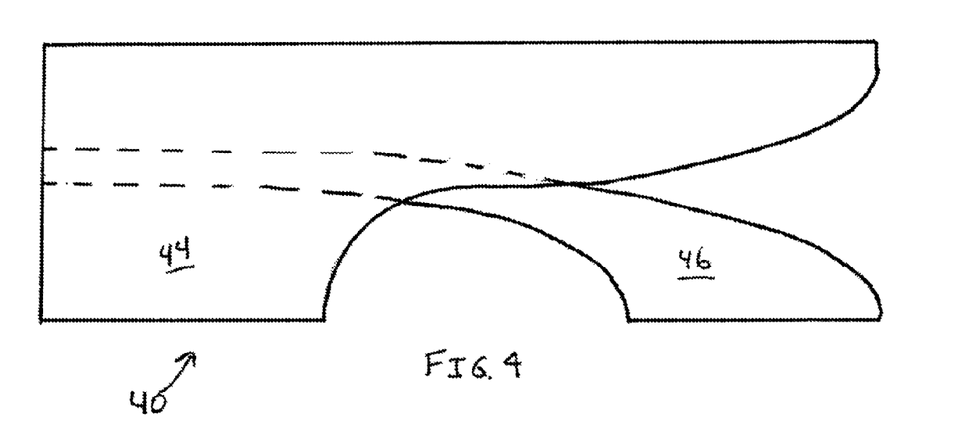
FIG. 4 is a plan view of the metallization layers of the encapsulated antenna of FIG. 3.

As shown in FIGS. 3 and 4, antenna 40 includes three planes of material, which include upper and lower ground plates 44 with a conductive plate 46 sandwiched between ground plates 44. Portions of conductive plate 46 positioned directly between ground plates 44 are shown in phantom in FIG. 4. The conductive plates 46 are preferably made of copper, but may be made of other metals, and other conductive materials. The dielectric/ground plates 46 may be made of epoxy, ceramic, Teflon®-brand polytetrafluoroethylene (PTFE) or other materials. In one embodiment, antenna 40 is about 135 millimeters (5.2 inches) long and about 45 millimeters (1.8 inches) high as shown in FIG. 4.

In operation, antenna/transducer 40 and body 42 are mounted or otherwise coupled to tooth 32 as shown in FIG. 5. In one embodiment, a shank mount is used to couple body 42 to tooth 32. A signal from signal generator 34 is provided to antenna 40 through cable 48. During excavating, as shown in FIG. 1, antenna 40 and body 42 are repeatedly positioned in ground 16 as dirt and other materials are excavated. As a result, antenna 40 is often positioned below the lowest portions of tracks 14. Further, antenna 40 is positioned into penetrations, such as depression 22, created by excavator 10 during the excavation process. As shown in FIG. 1, antenna 40 of transmitter 28 and detector 30 are simultaneously positioned in the soil 16 as teeth 32 create penetrations in the soil 16. In one embodiment, an antenna 40 is coupled to each tooth 32 of bucket 20. In one embodiment, a transmitter 28 and several detectors 30 are coupled to teeth 32 of bucket 20.

While positioned in the penetrations, signals are transmitted and detected by antennas 40 of transmitter 28 and detector 30. Because antenna 40 and dielectric body 42 are mounted on teeth 32, they cooperate to define cutting elements of teeth 32 with portions of body 42 defining cutting edge 50 of tooth 32. Thus, simultaneously with excavation, objects 26 are being detected. Further, because bodies 42 and antennas 40 are able to be lowered into penetrations 22 and assists in creating penetrations 22, objects 26 are closer to antenna 40 and more easily detected than if one was attempting to detect objects 26 before any excavation started. In one embodiment, body 42 is positioned between antenna 40 and the soil to protect antenna 40 during excavation. As a result, the signals transmitted and received by antennas 40 pass through body 42 on their way from and antenna 40 during respective transmission of the signal and receipt of the reflected signal.

Figure 6A:
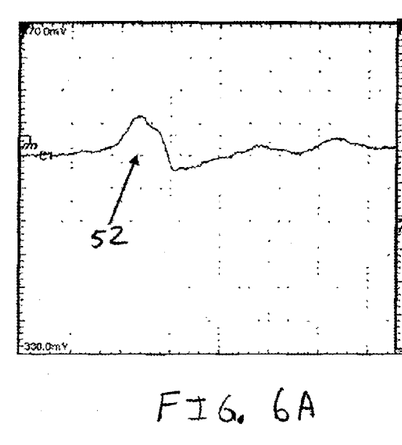
FIG. 6A is a graphical representation of the signal detected by the antenna of FIG. 2 with the transmitting and receiving antennas positioned above the ground consisting of soil.
Figure 6B:
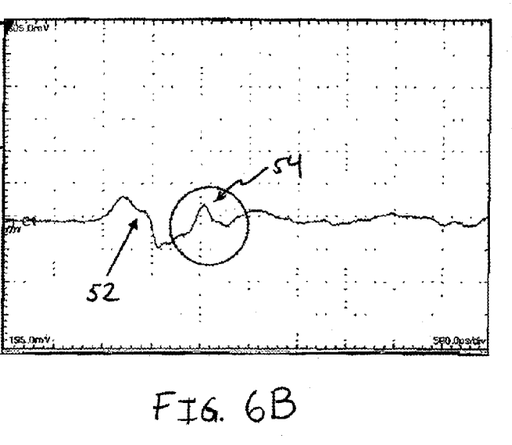
FIG. 6B is a view similar to FIG. 6A showing the signal detected by the antenna with the transmitting and receiving antennas positioned in contact with the ground and illustrating a peak indicative of a plastic pipe located in the ground.

Example outputs from detectors 30 are provided in FIGS. 6A-9C. In FIG. 6A, a signal is shown when antennas/transducers 40 of transmitter 28 and detector 30 are positioned above ground 16 without direct contact between the respective antennas 40 and ground 16. A peak 52 is shown that indicates crosstalk between antenna 40 of transmitter 28 and antenna 40 of detector 30. In FIG. 6B, antennas 40 of respective transmitter 28 and detector 30 are placed in direct contact with ground 16. In addition to showing a crosstalk peak 52, a second peak 54 is shown indicating the presence of a 2 inch (51 millimeters) diameter polyethylene pipe that was buried 4 inches (102 millimeters) in the test soil. As a result, a perceptible indication is provided indicating that an object 26, such as a plastic natural gas pipe, is in the path of bucket 20. A trained operator of excavator 10 can notice this indication to avoid striking pipe 26. Similarly, computer 37 can be programmed to recognize any peak after crosstalk peak 52 that satisfies a predetermined characteristic, such as slope. If computer 37 detects such a peak, or other predetermined characteristic, it can send an alarm, stop further movement of bucket 20, or otherwise attempt to avoid bucket 20 striking pipe 26.

Figure 7A:
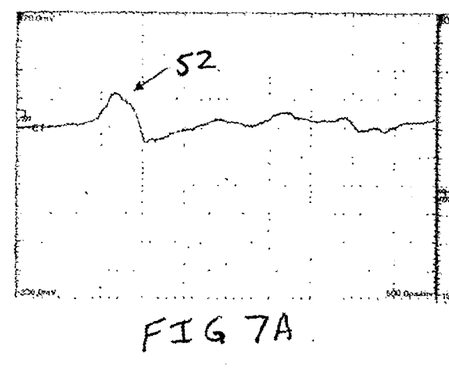
FIG. 7A is a graphical representation of the signal detected by the antenna of FIG. 3 with the transmitting and receiving antennas positioned above the ground consisting of sandy soil with no object in the sandy soil.
Figure 7B:
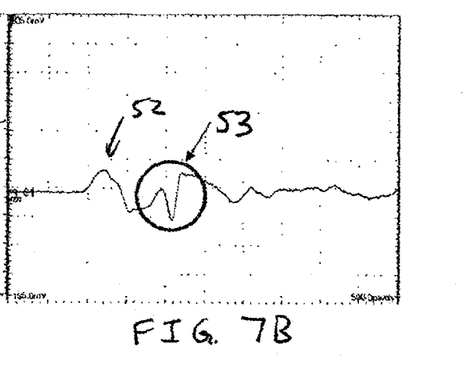
FIG. 7B is a view similar to FIG. 7A illustrating the signal detected by the antenna with the transmitting and receiving antennas positioned in contact with the ground and illustrating a peak indicative of a steel pipe located in the sandy soil.
Figure 8A:
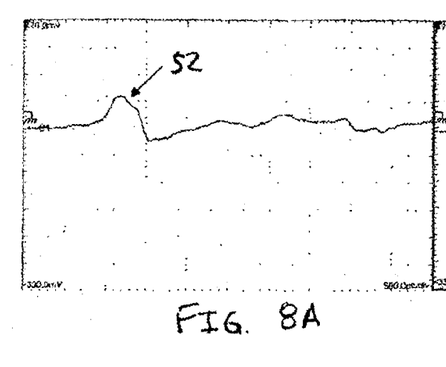
FIG. 8A is a graphical representation of the signal detected by the antenna of FIG. 3 with the transmitting and receiving antennas positioned above the ground consisting of sandy soil with no object in the sandy soil.
Figure 8B:
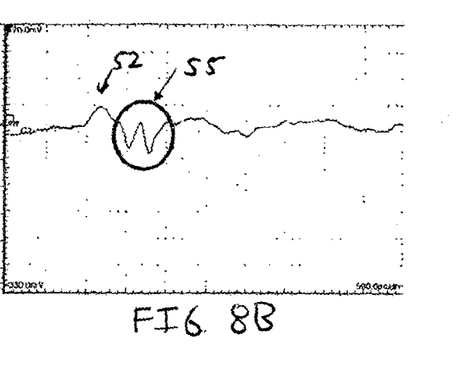
FIG. 8B is a view similar to FIG. 8A illustrating the signal detected by the antenna with the transmitting and receiving antennas positioned in contact with the ground and illustrating a peak indicative of a polyethylene pipe located in the sandy soil.

In addition to detecting objects 26, the reflections detected by detector 30 can also be used to determine characteristics of objects 26 buried within the ground 16. For example, FIGS. 7A and 7B illustrate the output of detector 30 for a 2 inch (51 millimeters) metal pipe buried in sandy soil at a depth of 4 inches (102 millimeters). In FIG. 7A, antennas/transducers 40 of transmitter 28 and detector 30 are above the ground 16. In FIG. 7B, antennas 40 of transmitter 28 and detector 30 are in direct contact with the ground and provide a distinctive, "cursive v" 53 pattern indicative of the metal pipe. FIGS. 8A and 8B illustrate the output of detector 30 for a 1 inch (25 millimeters) polyethylene pipe buried in sandy soil at a depth of 2 inches (51 millimeters). In FIG. 8A, antennas 40 of transmitter 28 and detector 30 are above the ground 16. In FIG. 8B, antennas 40 of transmitter 28 and detector 30 are in direct contact with the ground and provide a distinctive, "w" pattern 55 indicative of the plastic pipe. A trained operator of excavator 10 can notice the distinctive patterns 53, 55 of metal, polyethylene, and other pipes to determine the type of pipe. Similarly, computer 37 can be programmed to recognize any peak after crosstalk peak 52 that satisfies a predetermined characteristic, such as the shape of patterns 53, 55. If computer 37 detects such a pattern, or other predetermined characteristic, it can send an indication of the type of pipe, such as metal or plastic.

Figures 9A, 9B, 9C:
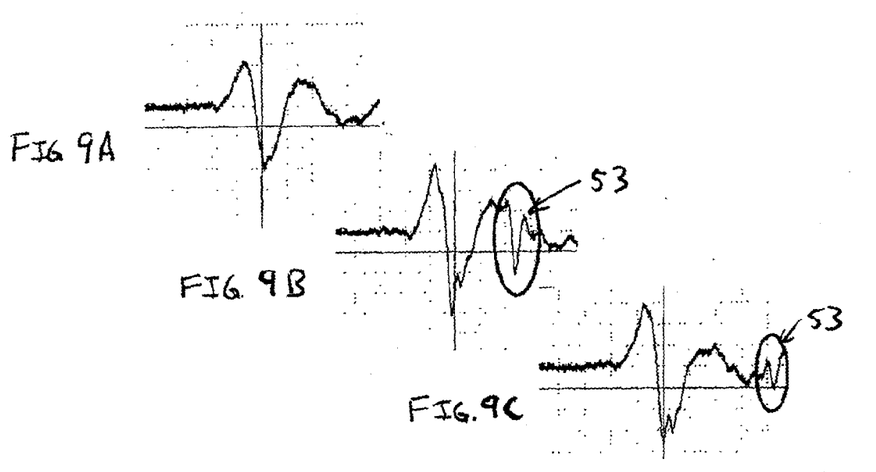
FIG. 9A is a graphical representation of a signal detected by the antenna of FIG. 3 without an object located in the soil.
FIG. 9B is a view similar to FIG. 9A illustrating a graphical representation of a detected signal with a steel pipe located about 6 inches (152 millimeters) deep in the soil.
FIG. 9C is a view similar to FIG. 9A illustrating a graphical representation of a detected signal with the steel pip located about 10 inches (254 millimeters) deep in the soil.

In addition to determining the presence and type of object 26, the reflections detected by detector 30 can also be used to determine the distance of object 26 from bucket 20 (or any other portion of excavator 10). Additional representations of the reflections detected by detector 30 are provided in FIGS. 9A-9C. In FIG. 9A, no object 26 is placed in the test soil so that no object 26 is detected when antennas 40 are placed in contact with ground 16. In FIG. 9B, a 2 inch (51 millimeters) diameter steel pipe was placed 6 inches (152 millimeters) deep in sandy soil and in FIG. 9C, the same pipe was placed 10 inches (254 millimeters) deep in the sandy soil. As shown by the circled region in FIGS. 9B and 9C, "cursive v" pattern 53 of the steel pipe occurs later in time in FIG. 9B than in FIG. 9C because the reflection took longer to reach detector 30 after being sent by transmitter 28. A trained operator of excavator 10 can notice the gap in time between a feature, such as crosstalk peak 52, and distinctive pattern 53 to determine the distance from object 26. Similarly, computer 37 can be programmed to recognize the time delay and calculate the distance of tooth 32 of bucket 20 from object 26 and provide an indication to the operator of the distance and/or use the distance as a trigger for an alarm or otherwise. The operator may use this distance information when performing fine movements around objects 26, such as known utility pipes or cables.

Figures 10, 11, 12, 13, 14:
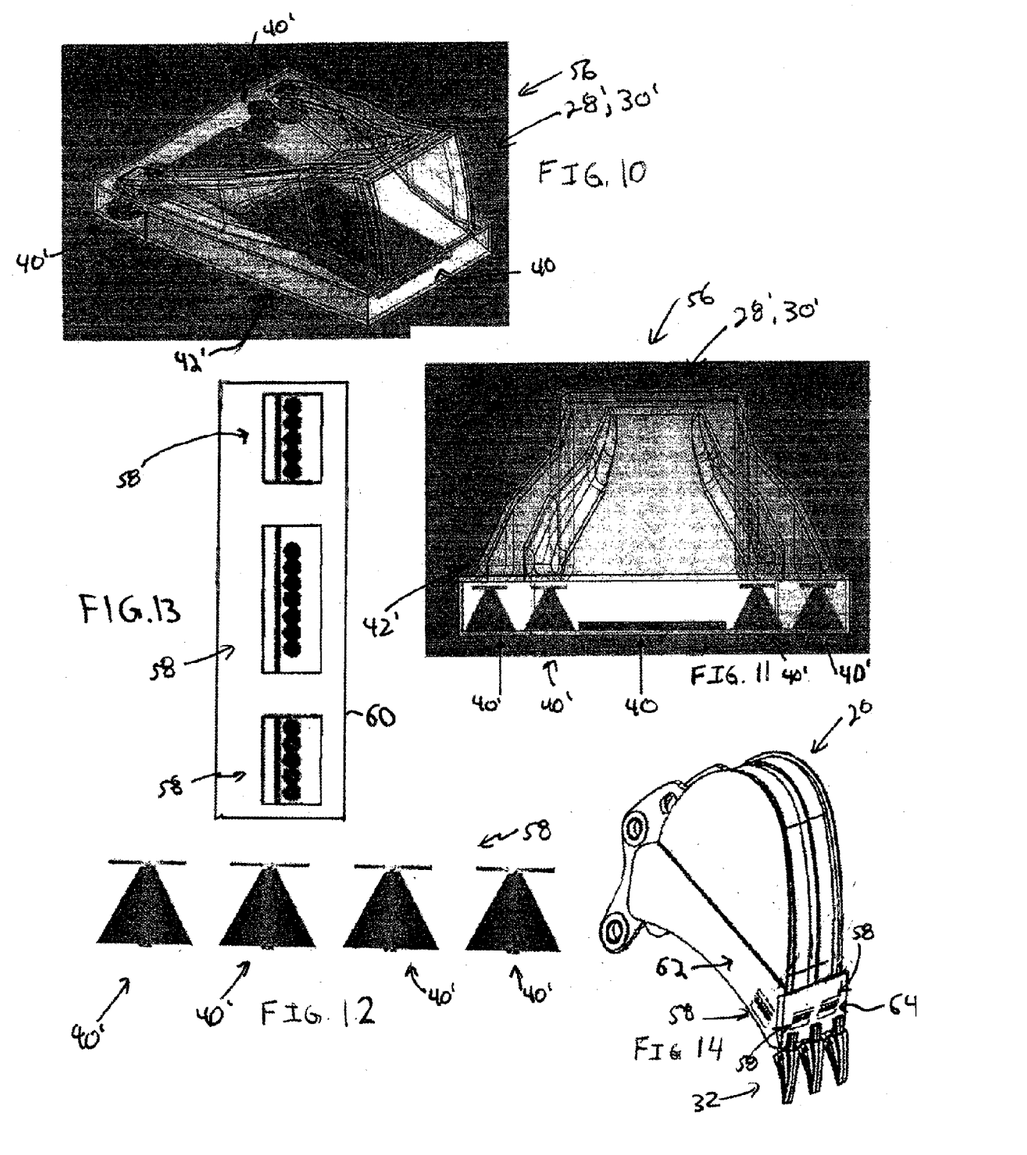
FIG. 10 is a perspective view of an exemplary bucket tooth illustrating the tooth including four discone antennas and a Vivaldi antenna.
FIG. 11 is an end view of the bucket tooth of FIG. 10.
FIG. 12 is an end view of an array of discone antennas.
FIG. 13 is a top view of a combination of discone antenna arrays.
FIG. 14 is a view of an excavator bucket showing discone antenna arrays mounted thereon.

Another embodiment of transmitter 28' and detectors 30' is shown in FIGS. 10 and 11 that includes four discone antennas/transducers 40' performing as detectors 30' and a Vivaldi antipodal antenna 40 performing as a transmitter 28'. Combined transmitter/detector 56 includes body 42' that encapsulates antennas 40, 40' in a manner similar to body 42, as described herein. An exemplary body 42' includes a Swampers bucket tooth available from John Deere Company. To enhance the directionality of discone antennas 40', if used as transmitters, antennas 40' may be aligned in an array 58 as shown in FIG. 12. To further improve the directionality of antennas 40', an array reflector may be positioned behind array 58. In one embodiment, a reflective metal plate, such as plate 60 illustrated in FIG. 13, for example, is placed at the back of array 58. In one embodiment, the array reflector is positioned between about 6 mm and 8 mm behind array 58, although other suitable distances may be used.

In FIG. 13, several arrays 58 with discone antennas 40' are provided as detectors and a transmitter to detect objects 26. In the illustrated embodiment, arrays 58 have differing numbers of discone antennas 40'. As illustrated in FIG. 14, arrays 58 may be placed on bucket 20 in locations other than on tooth 32. For example, arrays 58 may be mounted to a side wall 62 or a front wall 64 near an edge of bucket 20, although arrays 58 may be placed at other suitable locations. In one embodiment, discone antennas 40' are embedded in a dielectric medium, such as a dielectric shield or casing. In the illustrated embodiment, the dielectric medium has a dielectric constant of about 4 or 5. In one embodiment, the dielectric medium may have a dielectric constant ranging from about 1 to 20, but may have other values.

As described herein, object detection system 24 of FIG. 2 may include a transmitter 28 that emits a ground-penetrating signal and several detectors 30 that detect the reflections of the ground-penetrating signal from one or more buried objects 26. For example, bucket 20 of FIG. 5 may include at least one transmitter/transceiver 28 and several detectors 30 mounted to teeth 32. Similarly, arrays 58 of FIGS. 13-14 may include a transmitter/transceiver 28 and multiple detectors 30. In one embodiment, object detection system 24 includes at least three detectors/receivers 30.

Figure 15A:
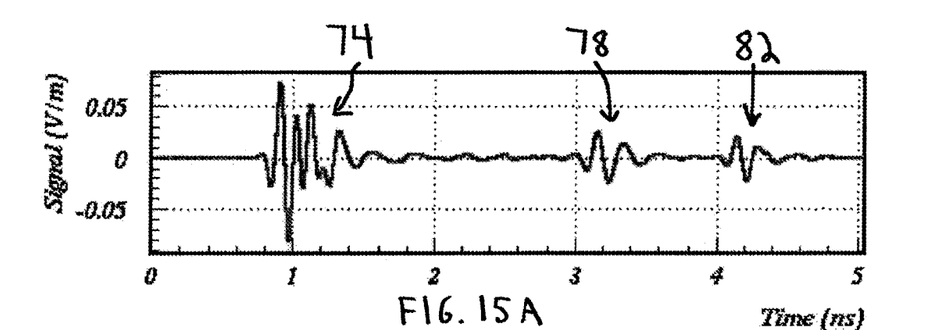
FIG. 15A is a graphical representation of a signal detected by a first detector of an antenna array positioned in contact with the ground with two objects located in the ground.
Figure 15B:
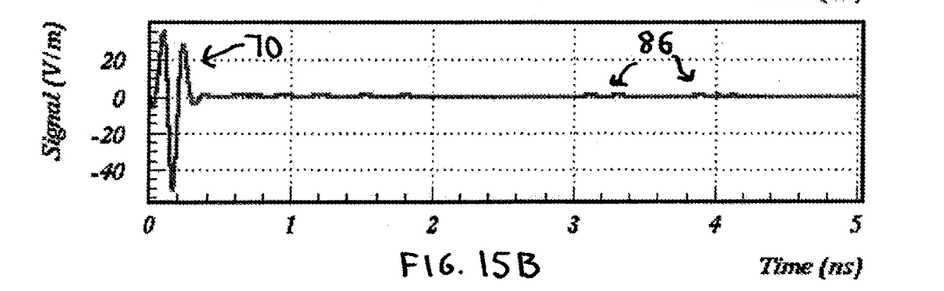
FIG. 15B is a view similar to FIG. 15A illustrating a graphical representation of the signal transmitted and detected by a transceiver of the antenna array positioned in contact with the ground with two objects located in the ground.
Figure 15C:
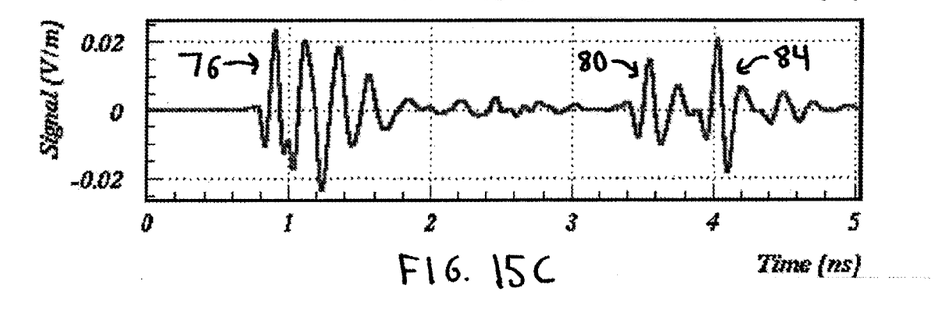
FIG. 15C is a view similar to FIG. 15A illustrating a graphical representation of the signal detected by a second detector in the antenna array positioned in contact with the ground with two objects located in the ground.

FIGS. 15A-15C provide exemplary outputs of multiple detectors 30 in an object detection system 24. In FIGS. 15A-15C, a transceiver 28 and two detectors 30 of FIG. 2 are positioned in contact with the ground to detect two objects located in the ground. Transceiver 28 is positioned between the two detectors 30, although other antenna arrangements may be provided. The signals of FIG. 15A correspond to a first detector 30, the signals of FIG. 15B correspond to transceiver 28, and the signals of FIG. 15C correspond to a second detector 30. Transceiver 28 provides a ground-penetrating signal, as represented by pulse 70 of FIG. 15B. After detecting crosstalk, shown at peaks 74 and 76 of FIGS. 15A and 15C, each detector 30 detects a reflection from each of the two objects. Due to the position and spacing of the particular detectors 30 relative to the transceiver 28 and the buried objects, the reflections from the objects are detected at different times by each detector 30. Peaks 78 of FIG. 15A represent the reflection from a first object received by the first detector 30, and peaks 80 of FIG. 15C represent the reflection from the first object received later by the second detector 30. Similarly, in FIG. 15A, peaks 82 represent the reflection from a second object received by the first detector 30, and peaks 84 of FIG. 15C represent the reflection from the second object received earlier by the second detector 30. In the illustrated embodiment, transceiver 28 also detects reflections from the buried objects, as represented by peaks 86 in FIG. 15B.

As illustrated in FIGS. 15A-15C, the reflections detected by each detector 30 have various magnitudes, times of arrival, curve signatures, and other properties that can be analyzed to determine the location and other characteristics, such as size or type, of the detected objects. Signal processor 39 of computer 37 may be programmed to analyze the reflection signals detected with detectors 30 and transceiver 28 to determine the position and other characteristics of the detected objects.

Figure 16A:
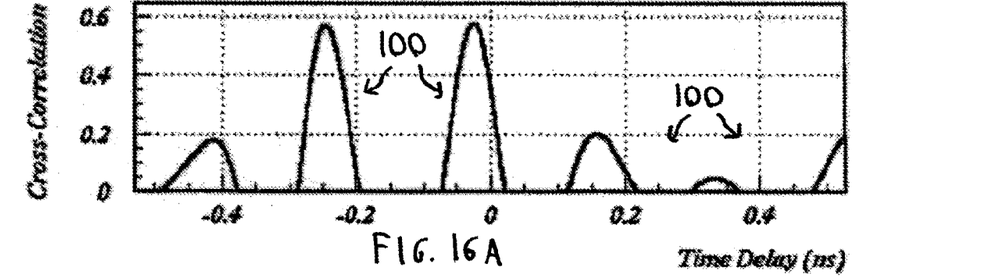
FIG. 16A is a graphical representation of a cross-correlation of the signals illustrated in FIGS. 15A and 15B.
Figure 16B:
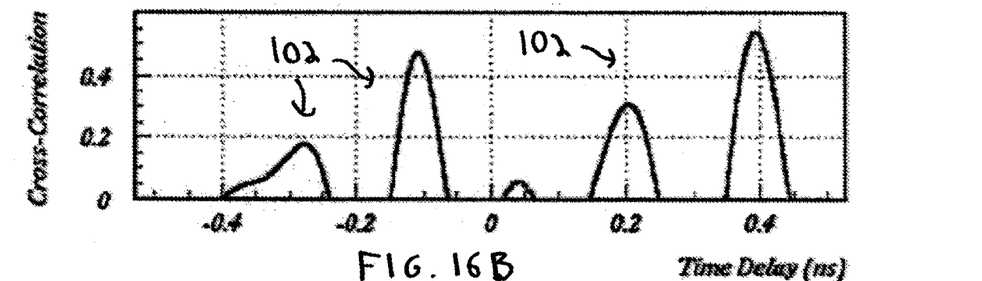
FIG. 16B is a graphical representation of a cross-correlation of the signals illustrated in FIGS. 15A and 15C.
Figure 16C:
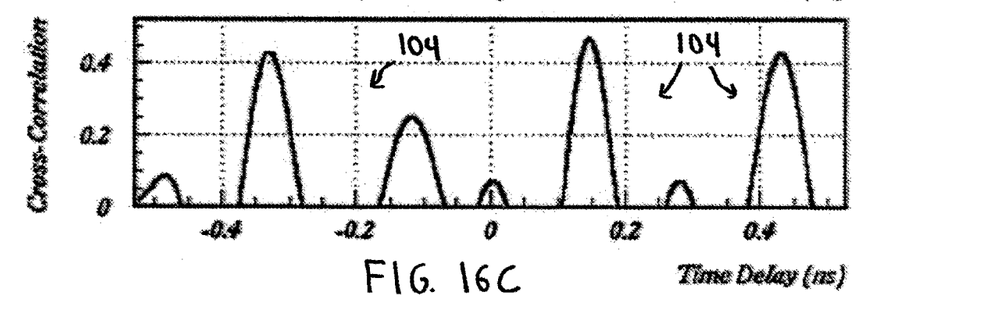
FIG. 16C is a graphical representation of a cross-correlation of the signals illustrated in FIGS. 15B and 15C.

In one embodiment, a time difference of arrival (TDOA) method is used to determine the relative location of the detected objects. In the TDOA method, processor 39 calculates the difference in the arrival times of the reflected signals at the different receivers of the antenna array. In the illustrated embodiment, these time delays are determined by calculating the pair-wise cross-correlation of the signal reflections measured at different receivers, and, based on the calculated time delays and dielectric properties of the soil, determining the relative positions (in a two- or three-dimensional space) of the target objects. The cross-correlation between two signal reflections from two different receivers may be represented as:

$$C_{12} = \int_{-\infty}^{\infty} s_1(t) s_2 * (t - \tau) dt \tag{1}$$

wherein $s_1$ is the signal reflection detected at a first antenna, $s_2$ is the signal reflection detected at a second antenna, and $\tau$ is the time delay between the two signals. The time difference of the arrival of the reflected signals corresponds to the peak or maxima in the cross-correlation of the reflected signals. Using the exemplary signals of FIGS. 15A-15C, exemplary maxima or peaks of the calculated correlation function (1) above are illustrated in FIGS. 16A-16C. The maxima 100 shown in FIG. 16A represent the time delay between reflection signals received at the first detector 30 and the transceiver 28. The maxima 102 shown in FIG. 16B represent the time delay between reflection signals received at the first detector 30 and the second detector 30. The maxima 104 shown in FIG. 16C represent the time delay between reflection signals received at the transceiver 28 and the second detector 30.

The position of a target object is determined in a two-dimensional space based on the cross-correlation function (1) for each receiver pair. For example, the position of the object in a two-dimensional space may be determined by solving the following equation:

$$d_{ij} = \sqrt{(X_i - x)^2 + (Y_i - y)^2} - \sqrt{(X_j - x)^2 + (Y_j - y)^2} \tag{2}$$

wherein (x, y) are the coordinates of the target, $(X_i, Y_i)$ and $(X_j, Y_j)$ are the coordinates of the transceiver 28 and/or receivers 30, and $d_{ij}$ is a difference in the target distance determined by the difference in the time of flight and the velocity of the signal propagation.

Figure 17A:
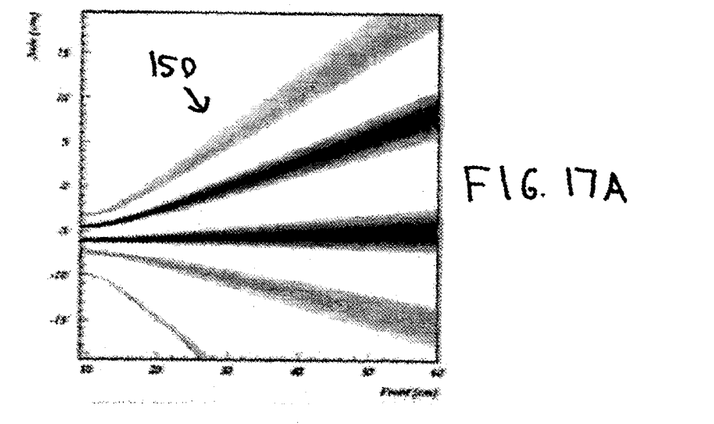
FIG. 17A is an exemplary hyperbola illustrating potential locations of buried objects based on the cross-correlated signals of FIGS. 15A and 15B.
Figure 17B:
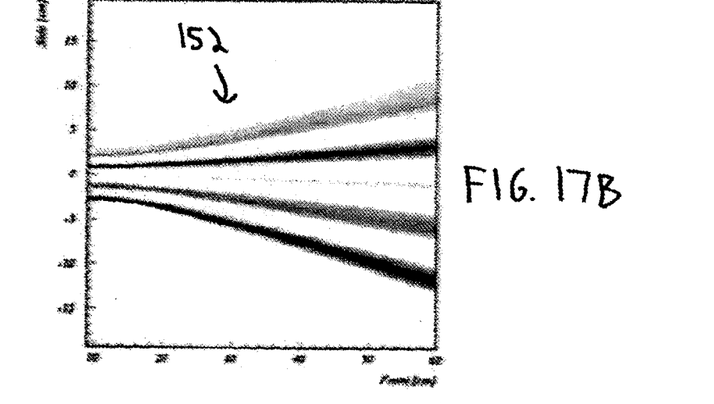
FIG. 17B is an exemplary hyperbola illustrating potential locations of buried objects based on the cross-correlated signals of FIGS. 15A and 15C.

The differences in the arrival times of the signal reflections determined from the cross-correlation function (1) are used to define hyperbolas for the cross-correlated signals of each receiver pair. In particular, each peak or maxima illustrated in FIGS. 16A-16C is used to calculate hyperbolas for each receiver pair. Each derived hyperbola represents estimated areas where the target object or objects may exist. The densities and widths of the hyperbolas are based on the height and the width of the maxima (peaks) of the cross-correlation function (1). Thus, a larger peak of the cross-correlation function (1) results in a greater density and width of the hyperbola. The position of the target object is determined by overlapping the hyperbolas from each receiver pair and identifying the areas of high density where the hyperbolas intersect. Thus, the denser and wider hyperbolas provide a greater indication of the location of the detected object(s). See, for example, the hyperbolas 150-154 illustrated separately in FIGS. 17A-17C and overlapped in FIG. 18. Hyperbolas 150-154 of FIGS. 17A-17C each represent areas where one or more objects may exist. Hyperbola 150 shown in FIG. 17A is based on the difference in the arrival times of the reflection signals received at the first detector 30 and the transceiver 28 (i.e., based on maxima 100 of FIG. 16A). Hyperbola 152 shown in FIG. 17B is based on time differences in the arrival of the reflection signals between the first detector 30 and the second detector 30 (i.e., based on maxima 102 of FIG. 16B). Hyperbola 154 shown in FIG. 17C is based on the time differences in the arrival of the reflection signals between the transceiver 28 and the second detector 30 (i.e., based on maxima 104 of FIG. 16C).

Figure 17C:
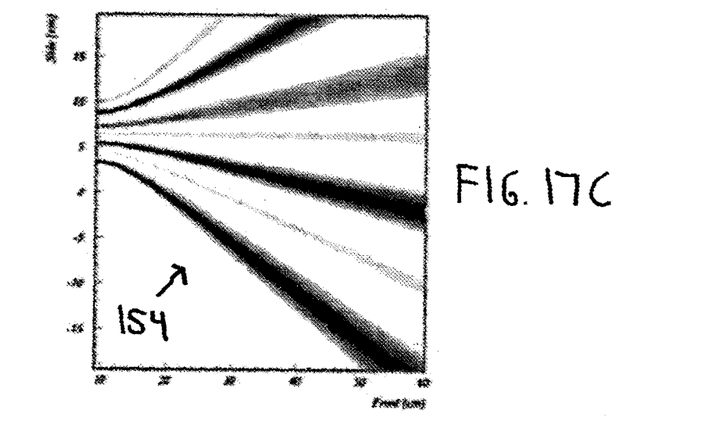
FIG. 17C is an exemplary hyperbola illustrating potential locations of buried objects based on the cross-correlated signals of FIGS. 15B and 15C.
Figure 18:
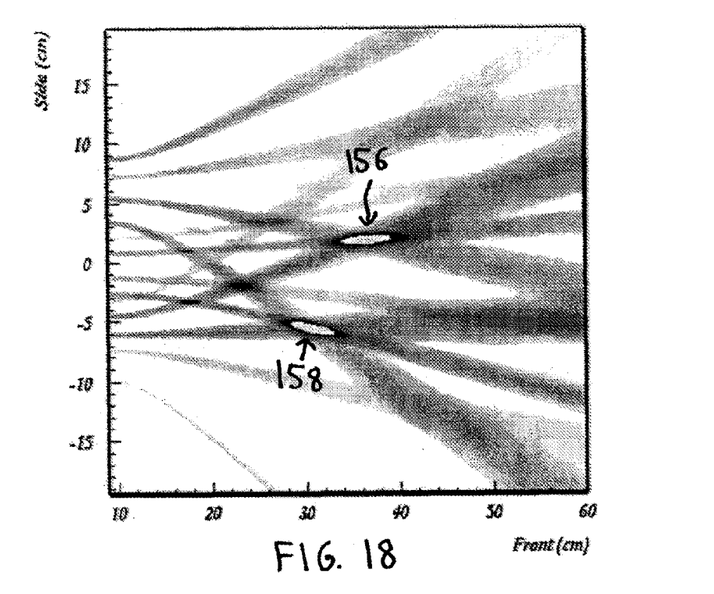
FIG. 18 is a view of the hyperbolas of FIGS. 17A-17C superimposed showing estimated locations of two buried objects.

The hyperbolas of FIGS. 17A-17C are shown superimposed in FIG. 18. The estimated positions of two detected objects correspond to the high-density areas 156, 158 where the hyperbolas intersect. As illustrated, area 156 indicates that a corresponding object is located about 35 cm in front of transceiver 28 and about 2 cm to the left of transceiver 28. Area 158 indicates that a corresponding second object is located about 30 cm in front of transceiver 28 and about 5 cm to the right of transceiver 28. In one embodiment, the estimated object positions determined in FIG. 18 are obtained by sampling the reflection signals in time intervals of about 1 picoseconds.

The position of a target object in a three-dimensional space is also based on the cross-correlation function (1) for each receiver pair. The position of the object in a three-dimensional space may be determined by introducing a third coordinate in equation (2) as follows:

$$d_{ij} = \sqrt{(X_i - x)^2 + (Y_i - y)^2 + (Z_i - z)^2} - \sqrt{(X_j - x)^2 + (Y_j - y)^2 + (Z_j - z)^2} \tag{3}$$

wherein (x, y, z) are the coordinates of the target, $(X_i, Y_i, Z_i)$ and $(X_j, Y_j, Z_j)$ are the coordinates of the transceiver 28 and/or receivers 30, and $d_{ij}$ is a difference in the target distance determined by the difference in the time of flight and the velocity of the signal propagation. In the illustrated embodiment, the detection of a signal reflection from an object by a minimum of three detectors 30 is required to determine the three-dimensional position of the object with the TDOA method. In one embodiment, to determine the three-dimensional position of the object(s), the antennas of transceiver 28 and receivers 30 do not lie in the same line, i.e., the alignment of the antennas is offset to some extent.

Knowledge of the dielectric properties of the soil may further be used in determining the location of detected objects. For example, the distance r of an object from a receiver is related to the time of arrival of the signal t (calculated as described above) and the velocity of the signal propagation v through the ground by the following equation:

$$r = vt \tag{4}$$

The velocity v of the signal in the ground depends on the dielectric property of the ground or soil, as illustrated by the following equation:

$$v = \frac{c}{\varepsilon} \tag{5}$$

wherein $\in$ is the dielectric property of the ground and c is the speed of light in a vacuum. By knowing the dielectric property $\in$ of the soil, the velocity v of the signal in the soil is determined with Equation (5). As such, the distance r of the object may be determined with Equation (4) based on the calculated velocity v and the time of arrival t measured at transceiver 28 and receivers 30. In one embodiment, the dielectric property $\in$ of the ground is determined based on crosstalk signals between the receivers, as described herein.

Other methods of detecting the locations of objects 26 (FIG. 1) may also be used, such as known methods including the time of arrival (TOA) method, the roundtrip time of flight (RTOF) method, the angle of arrival (AOA) method, and the received signal strength (RSS) method.

Referring again to FIGS. 1-2, when transmitter 28 is positioned above ground 16, the signals provided with transmitter 28 may interfere with other nearby radio frequency devices. To reduce the risk of signal interference, the magnitude and frequency of the signals provided with transmitter 28 are limited when antenna 40 of transmitter 28 is operating above ground 16. In some areas, a regulation agency, such as the Federal Communications Commission, may impose restrictions on ground-penetrating radar communication by setting limits on the available bandwidth and power density of ultra-wide band signals or other types of signals. In one embodiment, transmitter 28 and detector 30 operate in a range of about 3.1 GHz to 10.6 GHz when positioned above ground 16.

By positioning antennas 40 of transmitter 28 and detector 30 in contact with the ground, the risk of signal interference with other nearby radio frequency devices is reduced. Further, government regulations may be less restrictive or inapplicable to underground radio frequency or ultra-wide band signal communication. Accordingly, the magnitude and frequency of the signal provided with transmitter 28 may be increased when antennas 40 of transmitter 28 and detector 30 are in contact with the ground, providing a greater penetration depth of the generated signal. As a result, objects at a greater distance or depth from transmitters 28 and detectors 30 are detectable by objection detection system 24. With improved detection capability, object detection system 24 is able to provide greater advance warning upon detecting objects to allow for the avoidance of the detected objects. For example, the increased penetration depth of the generated signal provides additional time for signal processing and for an operator or a control system to react to avoid the detected object.

In the illustrated embodiment, the crosstalk or signal coupling between transmitter 28 and detector 30 is used to determine whether transmitter 28 is in contact with the ground so that the power and/or pulse duration of the generated signal may be increased. With antennas 40 of transmitter 28 and detector 30 in close proximity, some radiating energy transmitted from transmitter 28 is received by antenna 40 of detector 30 directly without first reflecting off a target object, resulting in crosstalk detected at detector 30. Soil or other ground medium between transmitting and receiving antennas 40 interferes with the crosstalk detected by the receiving antenna 40. For example, the interference of the soil may result in a reduction in magnitude, a phase change, a change in slope, or another characteristic change of the crosstalk signal. As a result, a dynamic change in the crosstalk signal level or signature between adjacent or closely mounted transmitting and receiving antennas 40 may be used to detect when antennas 40 of transmitter 28 and detector 30 are in contact with the soil or ground. Further, the crosstalk signal may arrive later at detector 30 when transmitter 28 is placed in contact with the ground due to the ground interference.

Figure 19A:
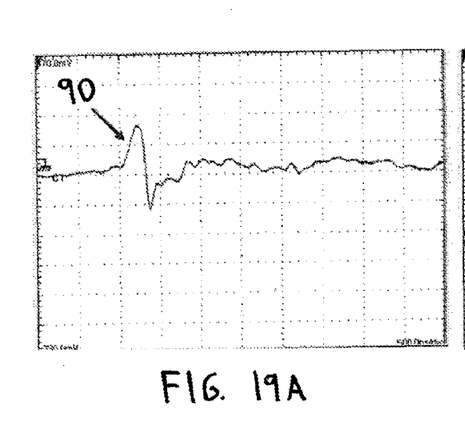
FIG. 19A is an exemplary graphical representation of a signal detected with the object detection system of FIG. 2 with the transmitting and receiving antennas positioned above the ground.
Figure 19B:
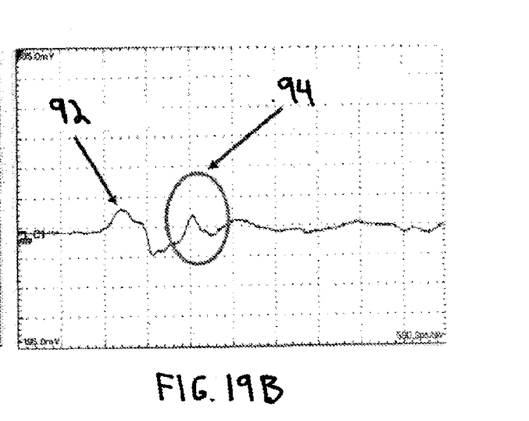
FIG. 19B is a view similar to FIG. 19A showing a signal detected with the object detection system with the transmitting and receiving antennas positioned in contact with the ground.

Referring to FIGS. 19A and 19B, peaks 90 and 92 illustrate crosstalk between detector 30 and transmitter 28 after transmission of a signal pulse with transmitter 28. In FIG. 19A, antennas/transducers 40 of transmitter 28 and detector 30 are positioned above ground 16 without direct contact between the respective antennas 40 and ground 16. In FIG. 19B, antennas 40 of respective transmitter 28 and detector 30 are placed in direct contact with ground 16. As illustrated, the slope of crosstalk peak 90 in FIG. 19A is steeper than the slope of crosstalk peak 92 in FIG. 19B. Similarly, the magnitude of crosstalk peak 90 is greater than the magnitude of crosstalk peak 92, illustrating a reduction in the crosstalk effect when antennas 40 of transmitter 28 and detector 30 are positioned in the ground. In one embodiment, the arrival time of the crosstalk signal at detector 30 after generation of the ground-penetrating signal pulse varies according to whether antennas 40 of transmitter 28 and detector 30 are positioned in the ground. In particular, the presence of soil between antennas 40 of transmitter 28 and detector 30 will cause a delay in the arrival of the crosstalk signal at detector 30 after transmission of the signal pulse by transmitter 28. Accordingly, the characteristics and/or time delay of the crosstalk peak of the reflected signal provide a perceptible indication of whether antennas 40 of transmitter 28 and detector 30 are in contact with the ground.

Based on the detected crosstalk response between transmitter 28 and detector 30, the power level, pulse width, and/or wavelength of signals emitted from transmitter 28 may be automatically adjusted upon detection of transmitter 28 and detector 30 contacting the ground. In one embodiment, processor 39 of computer 37 analyzes the crosstalk response of the signals detected with detector 30 and initiates a control event upon detection that transmitter 28 is in contact with the ground. Based on the control event provided with processor 39, signal generator 34 may automatically increase the magnitude and/or frequency of the ground-penetrating pulse from transmitter 28. In one embodiment, computer 37 includes an analog-to-digital (A/D) converter 35 (see FIG. 2) that provides a digital output to processor 39 that is representative of the magnitude of the crosstalk detected with detector 30. Based on the magnitude or the time delay of the output of A/D converter 35, processor 39 determines when transmitter 28 and detector 30 are positioned in the ground and causes signal generator 34 to increase the power and/or frequency of the ground penetrating signal provided with transmitter 28.

In one embodiment, the control event provided with processor 39 may enable or prompt an operator to manually increase the magnitude and/or frequency of the generated signal pulse. For example, detection system 24 may provide an audio or visual indication to an operator that transmitter 28 and/or detector 30 are in contact with the ground. In one embodiment, monitor 36 may provide a visual representation of the reflected signal for visual analysis by an operator. Upon observing a change in the characteristics of the crosstalk peak of the reflected signal, an operator may manually increase the power and/or frequency of the transmitted signal to increase the penetration depth of the transmitted signal.

In one embodiment, other characteristics of the ground-penetrating signal provided with transmitter 28 may be altered upon detection that antennas 40 of transmitter 28 and/or detector 30 contact the ground. Exemplary characteristics include the directionality of the signal, the pulse duration, or other signal level or signature-related characteristics.

The crosstalk response detected with detector 30 is also used to determine the dielectric properties of the soil, aggregate, or other ground material surrounding the transmitter 28 and detector 30. In one embodiment, the dielectric properties of the soil are determined based on the arrival time of the crosstalk signal at detector 30 after transmission of the signal pulse with transmitter 28 when the antennas 40 are positioned in contact with the ground. In particular, based on the known distance between antennas 40 of transmitter 28 and detector 30 and the time between transmission of the signal pulse with transmitter 28 and detection of crosstalk with detector 30, the dielectric properties of the ground are estimated. For example, using Equation (4) above, by knowing a distance r between two antennas 40 and measuring the time t between transmission of the signal pulse with transmitter 28 and detection of the cross talk with a detector 30, the velocity v of the signal may be determined. By plugging the determined velocity v into Equation (5), the dielectric property ∈ of the surrounding ground material may be determined. Alternatively, the magnitude and/or slope of the crosstalk peak, such as crosstalk peak 92 of FIG. 19B, for example, may also be used to estimate the dielectric properties of the soil or ground. The dielectric properties of the ground material may be used in calculating the location of the target object, as described herein. For example, the time difference of arrival (TDOA) method calculates the relative position of object 26 based on, among other parameters, the dielectric properties of the surrounding ground or soil. By analyzing the crosstalk between transmitter 28 and detector 30, the dielectric properties of the soil are determined and considered in calculating the position of object 26.

While this invention has been described as having preferred designs, the present invention can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains and which fall within the limits of the appended claims.

What is claimed is:

1. A method of communicating with ground penetrating radar, the method including the steps of:
    providing a transmitter and a detector each coupled to a tool configured to penetrate the ground;
    communicating a ground-penetrating signal with the transmitter;
    detecting crosstalk from the ground-penetrating signal with the detector; and
    determining, based on a characteristic of the crosstalk, that at least one of the transmitter or the detector is contacting the ground or is not contacting the ground.

2. The method of claim 1, wherein the characteristic of the crosstalk is an arrival time of the crosstalk at the detector after communicating the ground-penetrating signal.

3. The method of claim 1, wherein the characteristic of the crosstalk is the magnitude of the crosstalk.

4. The method of claim 1, wherein the detector and the transmitter are spaced apart on the tool.

5. The method of claim 1, wherein the transmitter and the detector each include a transducer and a dielectric medium, wherein at least a portion of the transducer is positioned within the dielectric medium.

6. The method of claim 1, further including:
    determining, based on the characteristic of the crosstalk, that at least one of the transmitter or the detector is contacting the ground; and
    communicating a second ground-penetrating signal with the transmitter based on determining that the at least one of the detector or the transmitter is contacting the ground, the second ground-penetrating signal having at least one of a greater magnitude or a greater frequency than the ground-penetrating signal.

7. The method of claim 6, further including detecting an object positioned in the ground based on a reflection of the second ground-penetrating signal from the object.

8. The method of claim 1, further including:
    moving the tool from a first position to a second position; and
    communicating a first ground-penetrating signal with the transmitter when the tool is in the first position and communicating a second ground-penetrating signal with the transmitter when the tool is in the second position.

9. The method of claim 8, wherein determining that at least one of the transmitter or the detector is contacting the ground or is not contacting the ground based on the characteristic of the crosstalk includes comparing the characteristic of the crosstalk from the first ground-penetrating signal with the characteristic of the crosstalk from the second ground-penetrating signal.

10. A method of communicating with ground penetrating radar, the method including the steps of:
    providing a tool and a detection system coupled to the tool, the detection system including a transmitter and a receiver, the tool being configured to penetrate the ground;
    communicating a ground-penetrating signal with the transmitter;
    determining, based on crosstalk between the transmitter and the receiver, that the detection system is contacting the ground; and
    increasing a magnitude of the ground-penetrating signal based on a determining that the detection system is contacting the ground.

11. The method of claim 10, further including moving the tool from a first position to a second position, wherein in the first position the detection system is positioned away from the ground and in the second position the detection system is positioned in contact with the ground.

12. The method of claim 11, wherein the ground-penetrating signal has a first magnitude based on the tool being in the first position, and the ground-penetrating signal has a second magnitude based on the tool being in the second position, the second magnitude being greater than the first magnitude.

13. The method of claim 10, wherein increasing the magnitude of the ground-penetrating signal includes increasing at least one of the power or the frequency of the ground-penetrating signal.

14. The method of claim 10, wherein determining that the detection system is contacting the ground includes comparing a characteristic of the crosstalk between the transmitter and the receiver when the tool is in the first position with the characteristic of the crosstalk when the tool is in the second position.

15. A method of communicating with ground penetrating radar, the method including the steps of:
    providing a tool and a detection system coupled to the tool, the detection system including a transmitter and a receiver and being configured to detect an object positioned in the ground;
    penetrating the ground with the tool to create a penetration;
    communicating a signal between the transmitter and the object;
    identifying crosstalk from the signal with the receiver;
    determining a dielectric property of a portion of the ground positioned between the transmitter and the receiver based on the crosstalk of the signal.

16. The method of claim 15, wherein the dielectric property is determined based on the arrival time of the crosstalk at the receiver after the signal is communicated from the transmitter.

17. The method of claim 15, wherein the dielectric property is determined based on the magnitude of crosstalk.

18. The method of claim 15, wherein the transmitter and the receiver are spaced apart by a distance, and the determination of the dielectric property of the portion of the ground is further based on the distance between the transmitter and the receiver.

19. The method of claim 15, further including detecting the object positioned in the ground based on a reflection of the signal from the object and calculating a position of the object based on the reflection and the determined dielectric property of the ground.

20. The method of claim 15, wherein the transmitter and the receiver each include a transducer and a dielectric medium, wherein at least a portion of the transducer is positioned within the dielectric medium to substantially reduce signal loss between the transducer and the ground.

21. A construction vehicle including:
a chassis;
a plurality of traction devices positioned to support the chassis;
a work tool supported by the chassis and configured to penetrate the ground; and
a detection system including a transmitter configured to communicate a ground-penetrating signal and a detector configured to detect crosstalk from the ground-penetrating signal, the transmitter and the detector being mounted to the work tool, the detection system being configured to determine that at least one of the detector or the transmitter is contacting the ground or is not contacting the ground based on a characteristic of the crosstalk from the ground-penetrating signal.

22. The construction vehicle of claim 21, wherein the characteristic of the crosstalk includes at least one of the arrival time of the crosstalk at the detector or the magnitude of the crosstalk.

23. The construction vehicle of claim 21, wherein the detection system includes a controller configured to analyze the crosstalk detected with the detector to determine that the at least one of the detector or the transmitter is contacting the ground and to initiate a control event based on the at least one of the detector or the transmitter contacting the ground.

24. The construction vehicle of claim 23, wherein the control event includes increasing at least one of the power or the frequency of the ground-penetrating signal.

25. The construction vehicle of claim 21, wherein the detection system includes a display configured to provide a visual indication that the at least one of the detector or the transmitter is in contact with the ground.

26. The construction vehicle of claim 21, wherein the detection system is configured to provide an audio signal upon a determination that the at least one of the detector or the transmitter is in contact with the ground.

27. The construction vehicle of claim 21, wherein the transmitter and the detector each include a transducer and a dielectric medium, wherein at least a portion of the transducer is positioned within the dielectric medium.

* * * * *

UNITED STATES PATENT AND TRADEMARK OFFICE
CERTIFICATE OF CORRECTION

PATENT NO. : 9,581,691 B2
APPLICATION NO. : 14/124567
DATED : February 28, 2017
INVENTOR(S) : Neven Simicevic et al.

Page 1 of 1

It is certified that error appears in the above-identified patent and that said Letters Patent is hereby corrected as shown below:

In the Claims

In Column 14, Line 32, in Claim 10, delete "on a determining" and insert -- on determining --

Signed and Sealed this
Thirtieth Day of May, 2017

Michelle K. Lee
*Director of the United States Patent and Trademark Office*